Jan. 10, 1956  K. B. BREDTSCHNEIDER  2,730,119
VALVE WITH RENEWABLE CAGE
Filed Sept. 6, 1950  2 Sheets-Sheet 1
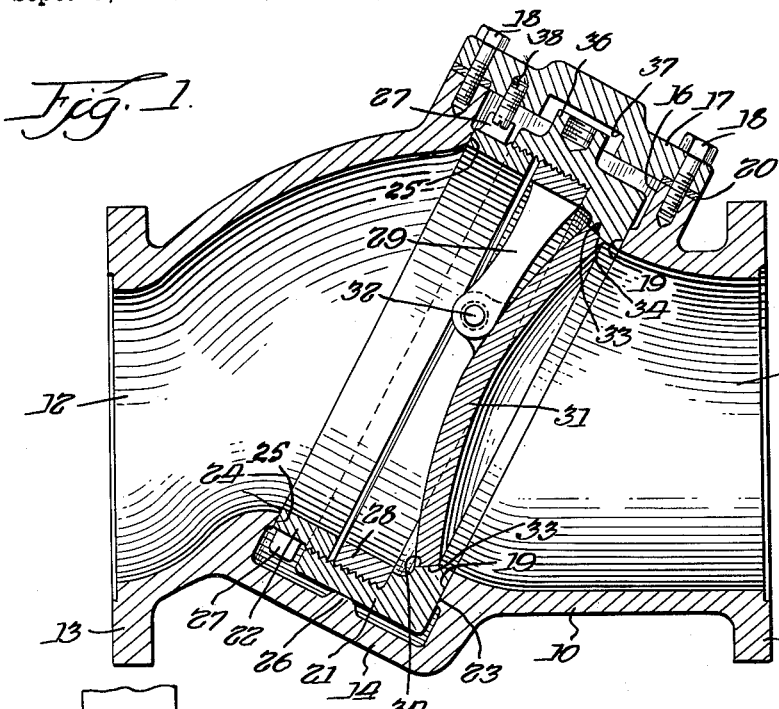
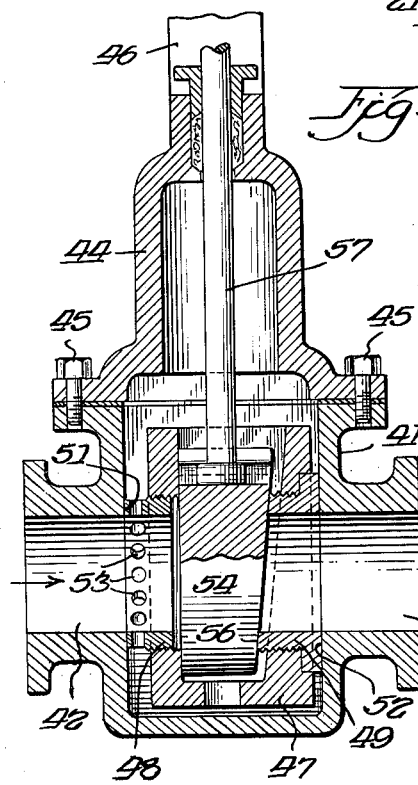
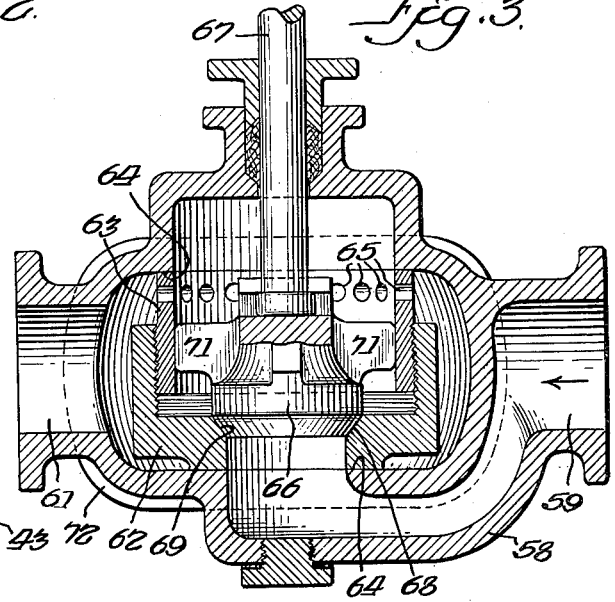
Inventor.
Kurt B. Bredtschneider.
By Joseph O. Lange
Atty.

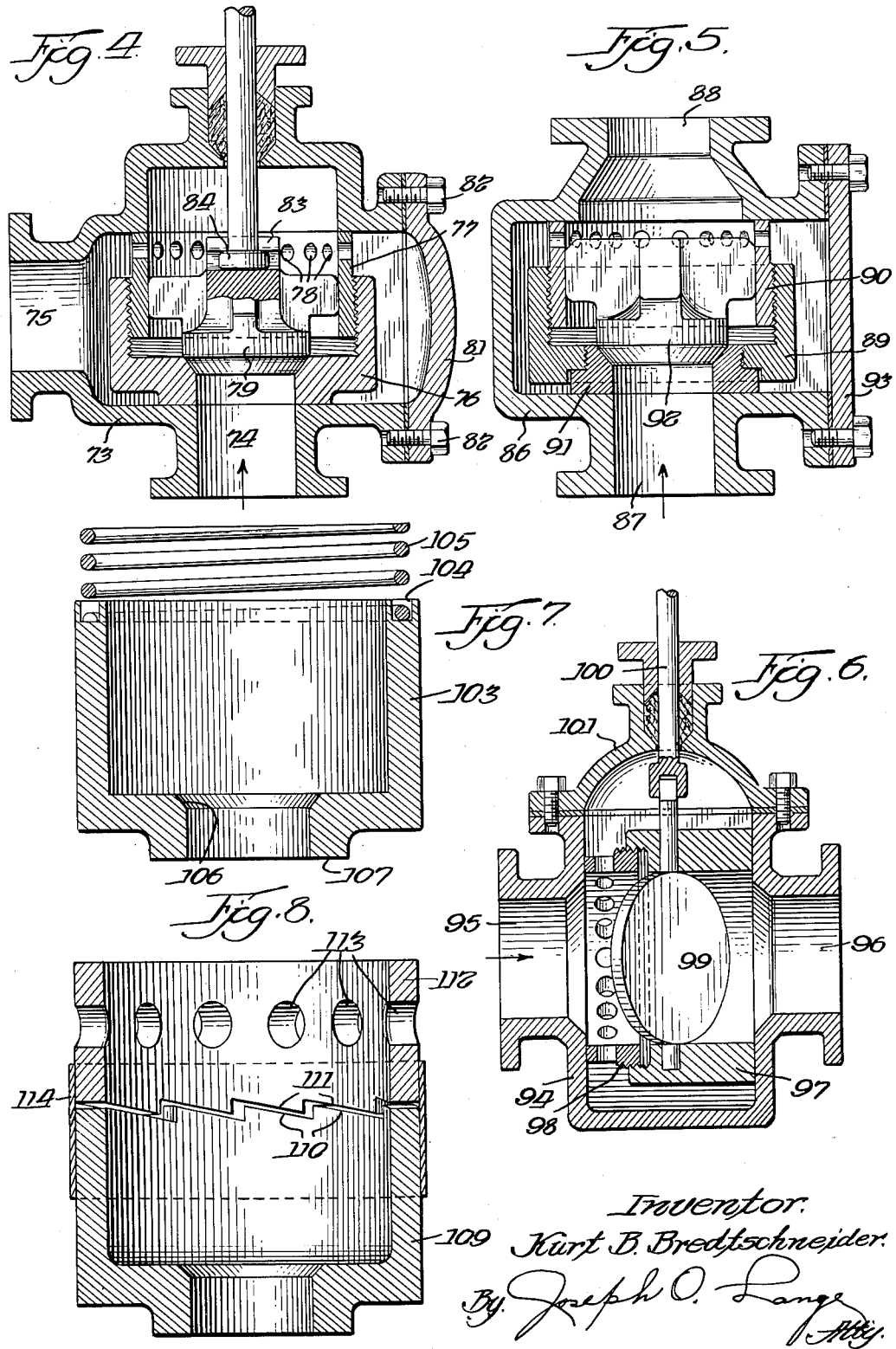

United States Patent Office 2,730,119
Patented Jan. 10, 1956

2,730,119

VALVE WITH RENEWABLE CAGE

Kurt B. Bredtschneider, Chicago, Ill., assignor to Crane Co., Chicago, Ill., a corporation of Illinois Application September 6, 1950, Serial No. 183,416

5 Claims. (Cl. 137—327)

This invention pertains to a novel valve construction. More particularly, this invention concerns a valve construction having a replaceable unit, such as a cage or housing, containing a seat and closure member. The said unit is fastened in the valve body chamber by spreading the replaceable unit between two parallel body surfaces preferably by a screw action in the flow direction.

Heretofore, in most valves the problem of making replacements or repairs on valve seats and closure members or discs has been a difficult one, time consuming and frequently involving costly shut-downs.

In considering presently known valves containing a replaceable unit comprising valve seats and a closure member, several disadvantages which are hereinafter stated are known to exist in these valves.

Some of the disadvantages are that the replaceable unit is difficult to secure within the valve body, also, assembling the valve replaceable unit results in deforming the inner valve seat, thereby preventing proper valve closing. In an attempt to overcome the above difficulties, the valve body is often constructed in two parts which construction presents a further disadvantage of requiring removal of the valve body from the pipeline if replacement of the internal members is desired. This construction results similarly in an expensive valve which requires considerable time in repairing and assembling.

The aforementioned disadvantages are overcome in the present invention.

It is, therefore, an important object of this invention to provide a valve construction having a conveniently removable and easily replaceable seat and closure member unit, and accomplishing such objective at relatively low cost.

It is a further object of this invention to provide a valve construction which comprises a single piece valve body which requires relatively little machining and thread cutting.

Still a further object is to provide a valve construction which permits the renewal of the valve seat and the closure member without removing the valve or casing from the pipeline upon which it is normally installed.

Another object is to provide a valve structure in which the seat and disc unit is free of the line loads or strains normally present.

Other objects and advantages will become more readily apparent upon proceeding with the following description read in light of the accompanying drawings, in which Fig. 1 is a sectional assembly view of a preferred embodiment of this invention applied to a swing check valve.

Fig. 2 is a sectional assembly view of a preferred embodiment of this invention applied to a gate valve.

Fig. 3 is a fragmentary sectional assembly view of a preferred embodiment of this invention applied to a globe valve.

Fig. 4 is a fragmentary sectional assembly view of a preferred embodiment of this invention applied to an angle valve.

Fig. 5 is a sectional assembly view of a preferred embodiment of this invention applied to a lift check valve.

Fig. 6 is a fragmentary sectional assembly view of a preferred embodiment of this invention applied to a butterfly valve.

Fig. 7 is a sectional view of a modification of this invention.

Fig. 8 is a sectional view of a further modification of this invention.

Similar reference numerals refer to similar parts throughout the several views.

At the outset, it should be noted that this invention applies to substantially all types of conventional valves and the drawings show the invention applied to such basic valve constructions.

In Fig. 1, this invention is shown in relation to a swing check valve, having a one-piece body portion 10 with fluid inlet 11 and outlet 12. The body is also provided with the usual pipeline connecting means, such as the oppositely disposed end flanges 13. In contradistinction to the usual structure employed, it should be particularly noted that the body 10 is not composed of the conventional opposite half portions with the usual flanged or threaded connection therebetween. Instead, the body is integrally formed of a single piece of generally annular configuration having a specially provided central portion 14 also of substantially annular shape.

It should also be noted that the portion 14 is preferably inclined relative to the valve center line for the purpose of employing an efficient type of swing check valve. The above described body design is not indispensable to this invention, but, rather, it is shown herein merely for the purpose of convenience of description of this invention. It will be apparent that the portion 14 could for some purposes be made normal to the valve center line without affecting the application of this invention.

One side of the body portion 14 is provided with a rectangular opening 16 over which a cover 17 is secured to the body by means of the bolts 18. A gasket 20 is disposed between the body 10 and cover 17 in the usual manner to effect a fluid tight joint therebetween.

Formed within the portion 14, on the interior of the body, two opopsitely disposed spaced-apart annular surfaces 19 and 25 are provided of which the surface 19 is preferably machined and functions as a valve seat. Located intermediate the surfaces 19 and 25 are two threadedly engaged or interconnected sleeve or cylindrical members 21 and 22 which contain seat surfaces 23 and 24, respectively, to correspond to surfaces 19 and 25, respectively. Guide means, such as a boss 26, is preferably provided within the portion 14 to align the sleeve 21 therewithin and to insure alignment of surfaces 23 and 24 with the respective body annular surfaces 19 and 25. The inner and smaller sleeve 22 is preferably threaded within the larger sleeve or cage 21. With the cover 17 removed from the body 10, and by means of a plurality of lugs 27 located on the periphery of the smaller sleeve 22, the latter may be actuated in any suitable manner to rotate with respect to and upon the threads of the sleeve 21. Thus, it will now be apparent that by predeterminately rotating the sleeve 22, the sleeves 21 and 22 may be made to extend relatively outward end-wise until their respective seats 23 and 24 abut the valve body seats 19 and 25, whereby a substantially fluid tight seal will be formed at least between surfaces 19 and 23. It is, of course, not absolutely necessary that a fluid tight seal be formed between the annular surfaces 24 and 25. An axial or end load is thus placed on the cage and sleeve members 21 and 22 which members are supported by the body surfaces 19 and 25.

Opposite inner annular shoulders on the cage 21 and the sleeve 22 provide a threaded opening for the reception of a threaded ring member 28 having an integral radially extending or depending arm 29. A valve closure or disc 31 is pivotally supported on the arm 29 by means of a pin 32 which serves as a closure pivot on the lower end of the arm. The outer periphery 33 of the disc 31 cooperates with a seat 34 which is formed by an inner annular portion of the sleeve 21. Thus, the swing check disc operates in a conventional manner in regard to disc motion, as set forth in greater detail in the Price U. S. Patent #1,744,798, issued January 28, 1930.

It should be evident that the ring 28 may be dispensed with, if desired, and a satisfactory alternative arrangement comprising arm 29 attached directly to one of the members 21 or 22 may be provided within the inventive concept.

To facilitate convenient removal transversely of the assembly of the previously described sleeve and cage members, a threaded shank 36 is preferably provided on the outer periphery of the larger sleeve or cage member 21. The shank 36 is located during valve assembly so as to be accessible in the body opening 16 for the purpose of receiving a threaded rod or other tool (not shown). Also, the shank serves to maintain the larger sleeve 21 in proper rotative position in the course of making the said assembly by means of the shank portion 36 being preferably receivable within a recess or restricted opening 37 on the underside of the cover 17, as illustrated.

Similarly, the smaller sleeve 22 may be held in desired rotative assembled position by means of the threaded pin 38 which preferably engages the cover 17, as shown, and projects therefrom into the space between the circumferentially arranged adjacent lugs 27 provided on the sleeve 22.

Thus, a novel means has been provided whereby the seat and disc or closure of a swing check valve may be readily removed as a unit transversely therefrom and through the body opening 16 without dismantling the valve body or disturbing the valve position in a pipeline, and as hereinafter apparent in greater detail is capable of wide and varied application in the field of valve construction.

In Fig. 2, the principle of this invention is shown applied to a reciprocably moveable gate valve. Here, a one-piece body 41 is shown having fluid inlet 42 and an outlet 43 therein with a central valve chamber therebetween. An upper body opening is enclosed with a bonnet 44 secured thereto by means of the bolts 45 and containing the usual yoke 46, with the actuating remainder of the valve upper portion not shown, as it is of a conventional nature to effect the reciprocal movement of the valve closure.

In the instant construction, an annular or cylindrical sleeve member or cage 47 and a threaded cylindrical member 48 are suitably positioned within the valve chamber to register with the valve inlet and outlet and thereby form a continuous flow passage. The sleeve 47 is preferably threaded to receive both the member 48, at the valve inlet end, and a seat ring 49, at the valve outlet end. The ring 49 preferably shoulders with the sleeve 47 to extend therebeyond, as illustrated. Sleeve 47 and the member 48 are threadedly engaged to provide for their extension within the valve chamber and thereby effect abutment of both the member 48 and the seat ring 49 against valve body seats 51 and 52, respectively. Thus, in the manner similarly described previously, an axial or endwise load is applied on the members 47 and 48.

It should be apparent that the seat ring 49 could be an integral part of the sleeve 47, or it could be eliminated entirely, with the sleeve 47 providing the necessary seating surface.

The smaller sleeve or threaded member 48 is shown provided with a plurality of apertures 53 which are suitable for engagement by any suitable rod or tool to effect the rotation of member 48. Obviously, the apertures 53 could be omitted and a fluid tight seal could be formed by the member 48 with body seat 51 without the fluid passages provided by the apertures 53. The means for effecting rotation could then consist of lugs or similar tool gripping means, as described in connection with Fig. 1.

A suitable opening is provided through a central section of the sleeve 47 wherein a closure member 54 is mounted to be reciprocal therewithin and thus selectively interrupt fluid flow through the valve.

It will be noted that an inwardly disposed surface 56 of the seat ring 49 forms an inclined annular seating surface for the member 54. Thus, the ring 49 forms a stationary seat with the body, as at body surface 52, and forms a closure member seat at an opposite end thereof, as at ring surface 56. It should be noted that the closure member 54 will abut against a surface of the sleeve or cage 47 on a surface opposite the ring 49. Thus, the closure is suitably positioned against the seating surface 56 which provides for fluid tight sealing within the valve on the downstream end, as indicated by the arrow, showing the direction of flow.

The usual valve actuating stem 57 is shown attached to the closure 54 and threadedly engages the yoke 46 through which the stem reciprocates in the conventional manner.

Thus, the entire upper portion of the valve may be removed from the body, leaving the valve chamber accessible. The axial load applied by the extension of the sleeve 47 and member 48 may then be released by threaded engagement thereof, and these members may then be easily removed from the valve. In this construction, it should be apparent that a means may optionally be provided for positioning and rotatably securing the member 47 within the valve during assembly. Such means may consist of guide ribs and grooves (not shown) or a pin and recess (not shown). Thus, member 47 is aligned with the movement of disc 54, and rotatably secured while threading with member 48.

As shown in Fig. 3, this inventive concept is employed in connection with a globe valve. It will here be noted that the body 58 is one-piece, having fluid inlet 59 on outlet 61 therein and a central chamber. In this construction, the threadedly engaged outer and inner cylindrical members 62 and 63 respectively are disposed within the valve chamber to abut the annular seat surfaces 64 on opposite upper and lower portions of the chamber. Thus, threaded engagement of the members 62 and 63 will seat the member 62 in a fluid tight manner within the valve body in the manner similarly described in connection with the other figures.

A plurality of annularly arranged apertures 65, located in an upper portion of the member 63, permits line fluid to pass from the latter member into the valve outlet 61. The apertures 65 may also be used in the gripping of the inner member 63 by a suitable rod or tool to effect rotation of the latter with respect to the outer sleeve member 62.

A reciprocally movable closure member 66 is positioned within the cylindrical members 62 and 63 to be movable therewithin by means of a conventionally operating stem 67. A lower annular surface 68 of the member 66 cooperates with the annular seating surface 69 of the cage member 62 to interrupt fluid flow through the valve. The closure member 66 is preferably formed with radially extending guide ribs 71 which slide within the member 63 during the actuation of the closure and maintain the latter in position.

A transversely extending removable cover plate 72 is preferably bolted onto the side of the valve body 58 which contains an auxiliary opening in the same manner as shown in Fig. 4 and hereinafter described in detail.

Thus, there is provided an access opening to the removable members within the valve chamber for assembling or removing the members 62 and 63, including the closure 66 which can be slipped off the T head of the stem, all as a unit. The remainder of the valve may otherwise be of a conventional construction.

Fig. 4 shows an application of this invention to an angle valve comprising a body 73 having fluid inlet 74 and an outlet 75, and a chamber therebetween. The cylindrical cage and sleeve members 76 and 77 are disposed within the chamber in alignment with the inlet 74 which is selectively closed by the valve disc or closure member 79. It will be noted that these cage and sleeve members are similar in structure and function to those described in connection with Fig. 3. Member 77 preferably contains a plurality of apertures 78 transversely located in the member 77 to permit fluid to flow therethrough and to facilitate tooling.

A cover plate 81 is secured to the side of the body 73 by bolts 82, and thus seals the auxiliary opening in the valve body. Thus, the internal valve members 76, 77, and 79 are readily accessible upon the removal of the cover plate 81.

It should be noted that for the purpose of assembly and disassembly of the valve, the dimension between the inner periphery of member 77 and the top outer peripheral portion 83 of the member 79 must be greater than the diameter of the stem head 84. The stem and disc connection may then be of a conventional disc collar and stem head connection.

In Fig. 5, a lift check valve is shown embodying this invention. The valve body 86 has inlet 87 and outlet 88 therein and an intermediate valve chamber. Similarly, cylindrical sleeve and members 89 and 90 are disposed within the chamber and are similar in structure and function as the members 76 and 77 described above in connection with Fig. 4. However, member 89 is shown to contain a renewable seat ring 91 which, it should be apparent, may optionally be provided on all of these cylindrical members throughout the several views.

A closure member 92 is located within the cylindrical members 89 and 90 and cooperates in the usual manner with the seat ring 91 to open and close the valve. A cover plate 93 is bolted to the side of the body 86 over the auxiliary opening therein, to provide the required access to the valve chamber.

Still a further application of this invention is shown in Fig. 6 in connection with a butterfly valve. Here, the valve body 94 has an inlet 95 and outlet 96 with an intermediate chamber wherein threadedly engaged cylindrical members 97 and 98 are located to provide a flow passage through the valve. Members 97 and 98 may be threadedly extended endwise to abut body seat surfaces and form a fluid seal therewith. A closure disc 99 is pivotally mounted for rotation within the member 97 to interrupt fluid flow therethrough, as indicated. An axially immovable stem 100 extends through the bonnet 101 to connect to the disc 99 to provide a means for rotating the latter.

Thus, it should be apparent that removal of the bonnet 101 will permit easy accessibility to the valve chamber and the members therewithin.

It will be obvious that although throughout the above description a pair of threadedly engaged cylindrical members are preferably employed, various modifications could be substituted therefor, with the desirable effect of an axial force on one of said cylindrical members. Such modifications may comprise the following described structures.

In Fig. 7 is shown the cylindrical member 103 which may be substantially the same general structure as the previously described member 62 of Fig. 3. A top annular portion of member 103 is provided with a groove 104 to receive and guide a coil spring 105 which performs the function of effecting an axial load on member 103. It will be apparent that the aforementioned function of spring 105 is similar to the function of member 63 of Fig. 3. In the instant modification, the surface 106 is the annular valve seat, and surface 107 abuts the valve body.

The means of employing the member 103 and spring 105 within a valve chamber should be apparent. The upper surface of the spring abuts an end interior surface of the valve body.

Thus, a spring may satisfactorily be employed in effecting the desired axial seating force of the cylindrical seat member in all types of valves.

A further modification of the preferred invention in effecting an axial seating force on a cylindrical seat member may comprise the following described structure (not shown). It should be evident that a plurality of threaded members, such as studs, bolts, or the like, could be employed intermediate the valve body and the upper surface of a cylindrical seat member. Thus, the desired seating force of the latter member could readily be effected while providing for removability of the members from the valve chamber, as in the various previously described examples.

The preferred arrangement of the above mentioned structure may also consist of a plurality of bolts threaded into the upper surface of the cylindrical member with the bolt heads abutting the valve body chamber surface. Thus, the bolts could be adjusted within the valve chamber with the desired resultant axial load operating to fluid tightly seat the cylindrical member with the valve body around a fluid opening therein.

Still a further modification of this invention is shown in Fig. 8 where the cylindrical members, such as 21 and 22 of Fig. 1, are axially extended by adjoining cam surfaces, which is here preferably accomplished by providing a cylindrical member 109 which may be of the same general shape as the cylindrical members previously described. The upper surface of member 109 contains a series of inclines or cams 110 which correspond to the cams 111 on the lower surface of cylindrical member 112. Thus, it is clear that relative rotation of members 109 and 112 will effect the desired relative axial movement therebetween for the purpose hereinabove described.

Apertures 113 may be provided in the member 112 for the purpose of establishing a fluid passage and also rotating means with a suitable rod or tool as previously described. An additional sleeve member 114 is preferably positioned around the cam surface between the members 109 and 112, and thereby maintains these members in axial alignment.

It should be understood that a locking device (not shown) may be employed within the casing to maintain members 109 and 112 in an extended position. However, with only a relatively slight angle of incline on cams 110 and 111, sufficient frictional force can be attained and thereby secure the members in place.

Although this invention has been described in specific forms adapted to various types of valves, it is susceptible to numerous changes and should be limited only by the spirit thereof and the scope of the appended claims.

I claim:

1. A valve comprising in combination a body having fluid inlet and outlet openings therein and an intermediate chamber communicating with said openings, said body having an auxiliary opening adjacent said chamber, a pair of engaged cylindrical members removably mounted within said chamber to substantially align with said inlet opening thereby to effect a fluid passage therethrough, said cylindrical members being axially adjustable to abut opposite surfaces of said chamber whereby the said members are maintained in position and at least one of said members effects a fluid tight seal with said body around one of said valve fluid openings, a valve seat formed by the said cylindrical member which forms a fluid tight seal with said body, a closure member pivotally disposed within said cylindrical members to operate on said seat and thereby interrupt fluid flow through said valve, a removable cover plate mounted over said auxiliary body opening to provide removability of said valve elements within said chamber upon drawing the two members together predeterminately.

2. In a pivotally mounted closure valve the combination comprising a one-piece body having inlet and outlet openings therein and an intermediate chamber communicating therewith, a pair of threadedly engaged cylindrical members removably mounted within said chamber to be substantially axially aligned with the path of fluid flow therethrough, said cylindrical members secured within said chamber by endwise adjustable extension thereof to effect abutment of said members with opposite sides of said chamber and thereby form a fluid tight seal with said body, a valve seat arranged on one of said cylindrical members, a pivotally movable closure member secured within said valve by at least one of said cylindrical members whereby said closure is operative on said seat to control flow through said valve, said body having a side opening into said chamber suitable for transverse removal of said members therewithin, a cover plate removably attached to said body to seal said side opening.

3. In a valve construction the combination of a casing, a closure member within the casing, a cage member comprising telescoped members adjustably disposed within said casing and substantially containing said closure member at least in the closed position of the valve, the said cage being endwise expandable within the said casing to sealingly engage opposed sides of the casing and defining a fluid passage therethrough, the said closure member cooperating with a valve seat formed on one of the telescopd members to control the flow of fluid through the valve, the said casing having side disposed port means for removing the said cage member and said closure member upon adjustment of the telescoped members to break engagement with said casing, at least one of said telescoped members having means for removal of said telescoped members transversely through said side disposed port means, the said port means in the casing being in communication with the interior of the said casing within which the said cage member is disposed, the said removal means being transversely disposed on the outer one of the telescoped members.

4. In a pressure actuated valve, the combination comprising a one-piece valve body having inlet and outlet openings therein and an intermediate chamber communicating therewith, said body having an auxiliary opening adjacent said chamber, a pair of adjustably engaged cylindrical members removably mounted within the said chamber to substantially align with said inlet and outlet openings to define a flow passage therebetween, said cylindrical members being endwise extendible to abut opposite surfaces of said chamber and thereby form a fluid tight seal with said body around at least one of said openings, a valve seat formed by one of said cylindrical members, the said valve seat being formed in the cylindrical member having the fluid tight seal with the said body, an arm depending from a cylindrical member, a closure member freely movable pivotally from said arm within at least one of said cylindrical members to cooperate with the said valve seat, a cover extending in a plane substantially parallel to the central axis of the said cylindrical members to enclose said auxiliary body opening.

5. A valve construction comprising in combination a valve body having inlet and outlet openings therein and an intermediate chamber communicating therewith, a pair of threadedly engaged cylindrical members removably mounted within said valve chamber to define a fluid flow passage therethrough, the said cylindrical members being adjustable to sealingly engage opposite sides of the casing and upon adjustment to break said engagement being movable transversely with respect to the axis of the flow path for removal from the said intermediate chamber, a closure member pivotally disposed within at least one of said cylindrical members adapted to effect a fluid tight seal with a valve seat formed on one of said cylindrical members to control the flow of fluid through the valve.

References Cited in the file of this patent

UNITED STATES PATENTS

| | | |
|---|---|---|
| 483,635 | Prince | Oct. 4, 1892 |
| 751,333 | Obolensku | Feb. 2, 1904 |
| 807,309 | Ott | Dec. 12, 1909 |
| 1,495,858 | McGinnis | May 27, 1924 |
| 1,711,924 | Davis | May 7, 1929 |
| 1,898,816 | Crossen | Feb. 21, 1933 |
| 2,402,406 | Jaegle | June 18, 1946 |
| 2,416,787 | White | Mar. 4, 1947 |

FOREIGN PATENTS

| | | |
|---|---|---|
| 18,944 | Great Britain | 1910 |